US011238515B1

(12) United States Patent
de Mesa et al.

(10) Patent No.: US 11,238,515 B1
(45) Date of Patent: Feb. 1, 2022

(54) SYSTEMS AND METHOD FOR VISUAL SEARCH WITH ATTRIBUTE MANIPULATION

(71) Applicant: A9.com, Inc., Palo Alto, CA (US)

(72) Inventors: Krystle Elaine de Mesa, San Mateo, CA (US); Aishwarya Natesh, Palo Alto, CA (US); Andrea Joyce Diane Zehr, Palo Alto, CA (US); Rupa Chaturvedi, Menlo Park, CA (US); Mehmet Nejat Tek, Santa Clara, CA (US); Julie Chang, Plano, TX (US)

(73) Assignee: A9.COM, INC., Palo Alto, CA (US)

( * ) Notice: Subject to any disclaimer, the term of this patent is extended or adjusted under 35 U.S.C. 154(b) by 185 days.

(21) Appl. No.: 16/265,389

(22) Filed: Feb. 1, 2019

(51) Int. Cl.
G06Q 30/00 (2012.01)
G06Q 30/06 (2012.01)
G06F 16/9535 (2019.01)
G06K 9/62 (2006.01)

(52) U.S. Cl.
CPC ..... *G06Q 30/0627* (2013.01); *G06F 16/9535* (2019.01); *G06Q 30/0603* (2013.01); *G06K 9/6215* (2013.01); *G06K 9/6253* (2013.01); *G06K 9/6255* (2013.01)

(58) Field of Classification Search
CPC . G06Q 30/0601–0645; G06Q 30/0631; G06Q 30/0627; G06Q 30/0603
USPC ..................... 705/26.1–27.2, 26.63
See application file for complete search history.

(56) References Cited

U.S. PATENT DOCUMENTS

2015/0142787 A1* 5/2015 Kimmerling ......... G06F 16/252 707/723
2019/0354609 A1* 11/2019 Huang .................... G06F 16/51
2020/0019636 A1* 1/2020 Srinivasaraghavan ..................... G06Q 30/0603

OTHER PUBLICATIONS

Schwartz, Barry. Google announces similar items schema for image search on mobile. Apr. 10, 2017. Published by Search Engine Land. Accessed via https://searchengineland.com/google-announces-similar-items-schema-image-search-mobile-272918 (Year: 2017).*

* cited by examiner

*Primary Examiner* — Allison G Wood
(74) *Attorney, Agent, or Firm* — Hogan Lovells US LLP

(57) ABSTRACT

The present embodiments provide visual search techniques which produces results that include both accurate similar items as well diversified items through attribute manipulation. In some embodiments, a feature vector describing the item of interest is obtained. A target feature vector is then generated at least partially from the original feature vector, in which the target feature vector shares only a subset of attribute values with the original feature vector and includes at least some values that are different from the original feature vector. An electronic catalog of items is then queried using the target feature vector, and a set of candidate items are determined from the electronic catalog based at least in part on similarity to the target feature vector. The original feature vector may be used to query for a set of similar items that are as similar as possible to the item of interest.

20 Claims, 8 Drawing Sheets

US 11,238,515 B1

SYSTEMS AND METHOD FOR VISUAL SEARCH WITH ATTRIBUTE MANIPULATION

BACKGROUND

With the expanding use of computer networks, such as the Internet, an increasing amount of commerce is conducted electronically. For example, consumers are increasingly utilizing electronic marketplaces to purchase clothing and other apparel items. Countless apparel items are for sale online, and being able to search quickly and efficiently for and apparel item is increasingly important, not only for online retailers who wish to sell their products, but for consumers who are looking to find a specific apparel item quickly. Generally, users often rely upon search queries or keyword strings that can be used to identify potentially relevant content. In many instances, however, the relevance depends at least in part to the actual query that was submitted, as well as the way in which the potentially relevant content is categorized or identified. There often is no easy way for a user to modify a query to express a desired refinement, and no accurate way for that expression to be implemented so as to locate the content of interest. This is particularly true for certain visual attributes that are difficult to quantify through existing keyword-based approaches.

BRIEF DESCRIPTION OF THE DRAWINGS

Various embodiments in accordance with the present disclosure will be described with reference to the drawings, in which.

DETAILED DESCRIPTION

Figure 1A:
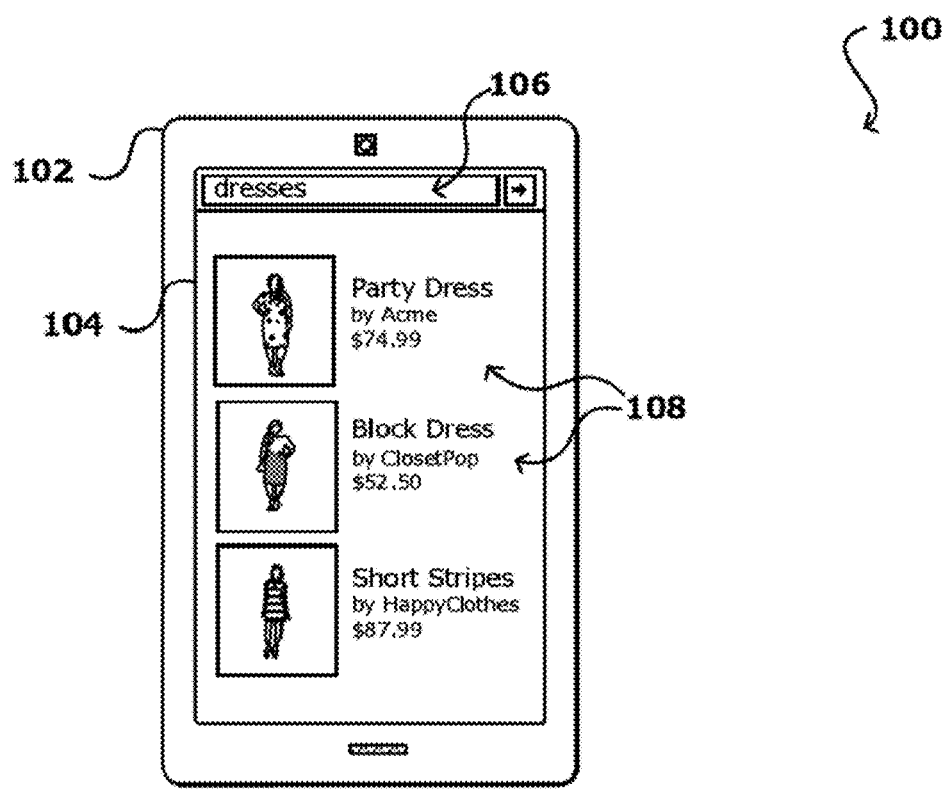
FIG. 1A-1B illustrate an example computing device providing access to an electronic marketplace.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for providing content in an electronic environment. In particular, various embodiments provide visual search techniques with attribute manipulation. In various embodiments, an electronic catalog of items may include image data, text descriptions, and other metadata associated with individual items in the electronic catalog. The image data associated with an individual item may be rendered to provide a visual representation of the item. Thus, visual attributes of the item may be extracted from the image data and such a catalog of items may be trained to be searchable based on the visual attributes. Thus, while browsing the electronic catalog, a user may select an item, and other recommended items may be displayed as additional recommendations based on their visual similarity to the selected item. However, unlike explicitly enumerated attributes that users can typically use to filter through items (e.g., size, designated color, price), the visual attributes extracted from image data using layers of a neural network provide far more information than can be explicitly expressed, and instead exists as a feature vector that describes the attribute values of the image or item. While neural network based visual search can conduct a much faster and broader search, and produce more accurate results than text based or node browsing search approaches, it may lack a certain diversity that other searching or browsing approaches provide. For example, a user using browsing by category nodes may be exposed to items that they may not have been looking for but that may catch their attention and inspire them, and potentially resulting in a purchase.

The present embodiments provide visual search techniques which produces results that include both accurate similar items as well diversified items through attribute manipulation. When a user selects an item of interest, the visual search may be initiated to find additional items from the catalog of items to present to the user. In some embodiments, a feature vector describing the item of interest is obtained. The feature vector includes a plurality of values corresponding to a plurality of attributes, respectively. A target feature vector is generated from the original feature vector of the selected item and used to query for items in the catalog. Unlike most visual search techniques in which the goal is to find items that are as close to the original feature vector of an item of interest, the target feature vector is a manipulated version of the original feature vector to add in some intentional diversity to the resulting item. Specifically, the attribute values for at least some of the attributes are maintained between the original feature vector and the target feature vector, such that the resulting items share those attributes with the selected item of interest. However, the attribute values for at least some of the attributes of the target feature vector do not match those of the original feature vector, such that the resulting items do not share those attributes with the selected item of interest. Thus, a set of diverse candidate items are selected in this fashion such that they provide a controlled amount of similarity to the item of interest but also an amount of diversity from the item of interest.

Additionally, in some embodiments, the catalog is also queried using the original feature vector to find a set of similar items that are as similar as possible to the item of interest. This way, a mix of the diverse items and the similar item can be presented to the user to maximize user engagement.

Various other features and application can be implemented based on, and thus practice, the above described technology and presently disclosed techniques. Accordingly, approaches in accordance with various embodiments improve the operation and performance of the computing device(s) on which they are implemented by enabling the computing systems to generate precision data (e.g., feature vectors) using computer vision, and utilize such data to produce search results. Conventionally, search system rely on user-defined labels to filter for items. For example, a user may label a certain item in an electronic catalog as have the color attribute value "red", the material attribute value of "metal", etc. This operation and performance of computing systems under such techniques are fundamentally limited to the amount and particular structure of user-provided data. In contrast, the present techniques enable computing system to generate additional data regarding an item, beyond user-provided labels, and even beyond what can be accurately described by human annotators or through human language. Machine generated precision data such as feature vectors can represent image data in ways no human can possibly generate, and can only be extracted using computing devices, and more specifically computing devices specially equipped with machine learning capabilities. Additionally, not only are computing devices indispensable to the generation of precision data such as feature vectors, but such data is also only readable by and meaningful to computing devices. Thus, the systems and methods described herein are fundamentally tied to computing machines and provide improvements to computing technology. Various other applications, processes, and uses are presented below with respect to the various embodiments, each of which improves the operation and performance of the computing device(s) on which they are implemented.

Figure 1B:
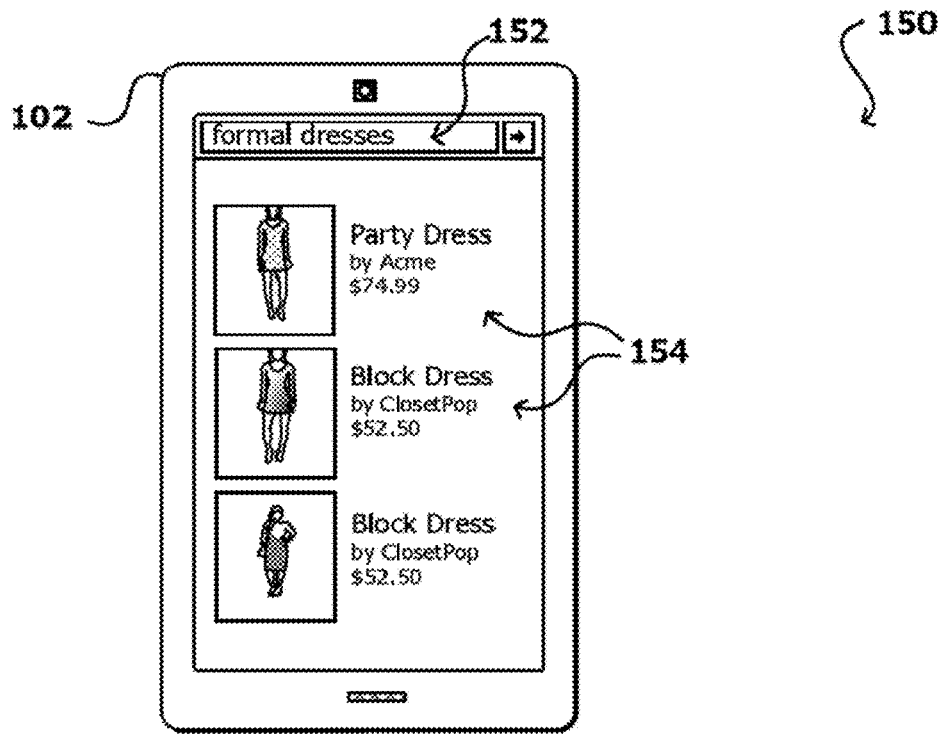

FIGS. 1A and 1B illustrate an example 100 computing device 102 providing access to an electronic marketplace 104, in accordance with various embodiments. In this example, although a tablet computing device is shown in this example, it should be understood that various other types of electronic device that are capable of determining and processing input can be used in accordance with various embodiments discussed herein. These devices can include, for example, smart phones, e-book readers, desktop computers, notebook computers, personal data assistants, video gaming consoles or controllers, smart televisions, and portable media players, wearable computers (e.g., glasses, watches, etc.) among others. Further, the components illustrated can be part of a single device, while at least some components illustrated and otherwise utilized for such a device can be provided as one or more peripheral devices or accessories within the scope of the various embodiments.

In a conventional system, a user can search for items (goods and/or services) in an electronic item catalog of an electronic marketplace. A catalog of items (including each item's description) may be organized into a "browse tree" structure in order to facilitate searching. A browse tree permits users to "browse" through various items, which are arranged in the form of a hierarchical tree. The browse tree may be displayed via a user interface as a collection of hyperlinks, each hyperlink corresponding to a section of the tree. A user can find an item by navigating through the various nodes of the browse tree.

Additionally, in many situations, the electronic marketplace may provide a search interface 106 that enables a user to search for a desired item. The search interface may return search results based on relevance of particular items to the customer's search query. For example, FIG. 1A illustrates an example display of content on a display screen 104 of a computing device 102. In this example a search query has been received and a set of search results 108 determined and returned for presentation in response to the request. In this example the user has submitted a query including the keyword "dresses" and the returned search results have been determined to be relevant in some way to the keyword. This can be due to a categorization of the results, keywords associated with the results, or tags applied to the result, among other such options. The user can scroll or otherwise navigate through the results to determine whether any of the results are of interest to the user.

It might be the case, however, that there were too many results returned and the user is not finding items of interest in an initial subset of the results. Accordingly, the user might want to narrow the query in order to obtain search results that are more relevant or of interest to the user based on the user's current interest. For example, FIG. 1B illustrates example 150 of an updated set of search results 154 returned for a new query 152 that specifies "black dresses." Similarly, if the user would like a different type of dress the user might want to modify the query in some way. For example, if the user had originally submitted a query such as "cocktail dresses" but is instead interested in results that are less formal, the user would need to submit a query that describes a different type of dress, such as summer dresses. However, even with a search interface in place, it can be difficult for customers to find relevant items. For example, the user may be looking for items to wear to a particular occasion or items that are within their particular comfort range. Unless the user knows an exact brand or style of an item that the user wants, or the appropriate search terms, the user might have to search through hundreds or thousands of different items using various options to attempt to locate the type of item in which the user is interested. If the user is interested in an item of a specific type, the user might have no option but to sift through these results, potentially only being able to narrow the results by price, ratings, availability, or other such options.

There are various downsides to such approaches, however. For example, dresses may be available that are red or have a similar color to red as well as having a short length that may not appear in the updated results because the dresses are not categorized, classified, or otherwise identified as being visually similar to the image query. Further, short length is a subjective descriptor and dresses that are categorized as short by one person may not match the desires of the user. Additionally, there may be many visual attributes that a user might specify, such as length, shape, pocket style, sleeve style, and the like, and it will often be the case that content for dresses will not include information for all of these attributes, let alone all possible options for each attribute. Thus, a keyword-based approach will likely miss some of the relevant dresses that would otherwise correspond to the user's intent. Further, a user might have a very clear idea in her mind as to the type of result she wants to obtain, but may not know exactly how to describe the item through keywords in order to obtain the exact result. For example, the user might want to see dresses with a particular style but may not know the correct term to describe that style. For instance, it can be difficult to describe a shoe with a particular shape or a shirt top with a particular pattern.

Similarly, if the user wants an item with sleeves of a certain length, there may be no consistent way of describing that particular length. As such, attribute filters or text-based searching using keywords or natural language queries can be difficult methods for a user to find a particular product, even when combined with visual image searching functionality.

Further, there can be some items that are not easily classifiable with a single classification. For example, an image of a dress might be presented where the dress represented in the image has a visual attributes that exhibit aspects of various types of different attributes. For example, a neckline style may have different aspects of different types of neckline styles such that it is a hybrid neckline that shares aspects of different types of necklines. It has been demonstrated that certain fashion details, such as neckline, collar, sleeve, shape, length, pocket etc., can have a significant influence on online shoppers' choices when those shoppers are searching for items with aesthetic or visual components, such as clothing items. The inherent limitation of text-based search makes it difficult to return an accurate result, especially when an item for which a customer is searching does not fit a strict or typical instance of a particular category or type of item.

In various embodiments, an electronic catalog of items may include image data, text descriptions, and other metadata associated with individual items in the electronic catalog. The image data associated with an individual item may be rendered to provide a visual representation of the item. Thus, visual attributes of the item may be extracted from the image data and such a catalog of items may be trained to be searchable based on the visual attributes. Thus, while browsing the electronic catalog, a user may select an item, and other recommended items may be displayed as additional recommendations based on their visual similarity to the selected item. However, unlike explicitly enumerated attributes that users can typically use to filter through items (e.g., size, designated color, price), the visual attributes extracted from image data using layers of a neural network provide far more information than can be explicitly expressed, and instead exists as a feature vector that describes the attribute values of the image or item. While neural network based visual search can conduct a much faster and broader search, and produce more accurate results than text based or node browsing search approaches, it may lack a certain diversity that other searching or browsing approaches provide. For example, a user using browsing by category nodes may be exposed to items that they may not have been looking for but that may catch their attention and inspire them, and potentially resulting in a purchase.

Figure 2:
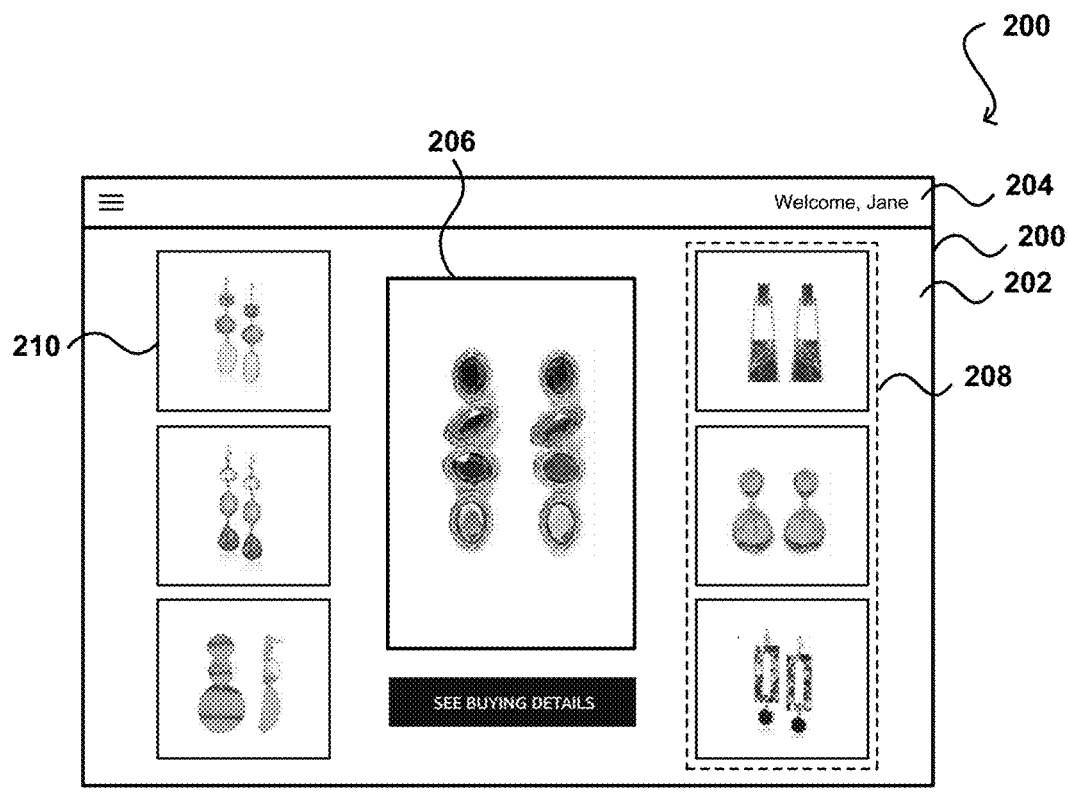
FIG. 2 illustrates an example implementation, in accordance with various embodiments of the present disclosure.

FIG. 2 illustrates a client device 200 displaying an example interface 202 of an electronic marketplace, such as an online shop, in accordance with various embodiments. A user 204 may be logged into the electronic marketplace via the client device 200. This, the provider or server-side of the electronic marketplace is able to connect a user account to the client device and access data associated with the user account as well as register current activity to the user account. The interface 202 may include an item of interest 206 selected by the user. In various embodiments, the item of interest 206 may be images of items offered for consumption in an electronic marketplace. For example, as a user browses the electronic marketplace and engages with products shown automatically or as search results, the user may be able to select the item as an item of interest 206 to receive additional product recommendations based on that selection. The additional product recommendations may include other items in the electronic marketplace. In this case, images of the item of interest 206 may already have been processed such that the portions of the image and feature vectors corresponding to various visual attributes are already identified and extracted. In various embodiments, the item of interest 206 may be provided by the user, such as an image uploaded by the user that is not originally a part of the electronic marketplace data. For example, the image may be captured via a camera on the user device and uploaded. In another example, the image may be a screenshot captured by the user while browsing the Web. Thus, the item of interest 206 may also be images that are uploaded and processed on the fly at the time of the query in order to identify and extract data from the parts of the image corresponding to the various visual attributes.

Upon receiving a selection of an item of interest 206 by the user, the additional product recommendations may be determined and displayed alongside the item of interest 206, as illustrated. In order to determine the product recommendations, the item of interest 206 may be considered the subject of a visual search query. As mentioned, the present embodiments provide visual search techniques which produces results that include both accurate similar items 210 as well diversified items 208 through attribute manipulation. Unlike most visual search techniques in which the goal is to find items that are as close to the original feature vector of an item of interest, the target feature vector is a manipulated version of the original feature vector to add in some intentional diversity to the resulting item. The diverse items 208 may be determined by generating a target feature vector. The original feature vector includes a plurality of values corresponding to a plurality of attributes, respectively. The target feature vector is generated from the original feature vector of the selected item of interest 206 and used to query for items in the catalog. Specifically, the attribute values for at least some of the attributes are maintained between the original feature vector and the target feature vector, such that the resulting items share those attributes with the selected item of interest. However, the attribute values for at least some of the attributes of the target feature vector do not match those of the original feature vector, such that the resulting items do not share those attributes with the selected item of interest 206. Thus, a set of diverse candidate items 208 are selected in this fashion such that they provide a controlled amount of similarity to the item of interest but also an amount of diversity from the item of interest. Additionally, in some embodiments, the catalog is also queried using the original feature vector to find a set of similar items 210 that are as similar as possible to the item of interest. This allows the user to see items that are as similar as possible to the item of interest 206 as well as items that are somewhat similar but with some attributes that are different.

In some embodiments, the diverse items and the similar items may be displayed on the interface 202 in many configuration. For example, FIG. 2 illustrates an embodiment in which the diverse items 208 are displayed on the right side of the item of interest 206 and the similar items 210 are displayed on the left side of the item of interest 206. This way, the user can easily access either group of recommended products but also can also easily tell which recommendations are in the diverse group and which recommendation are in the similar group.

Figure 3:
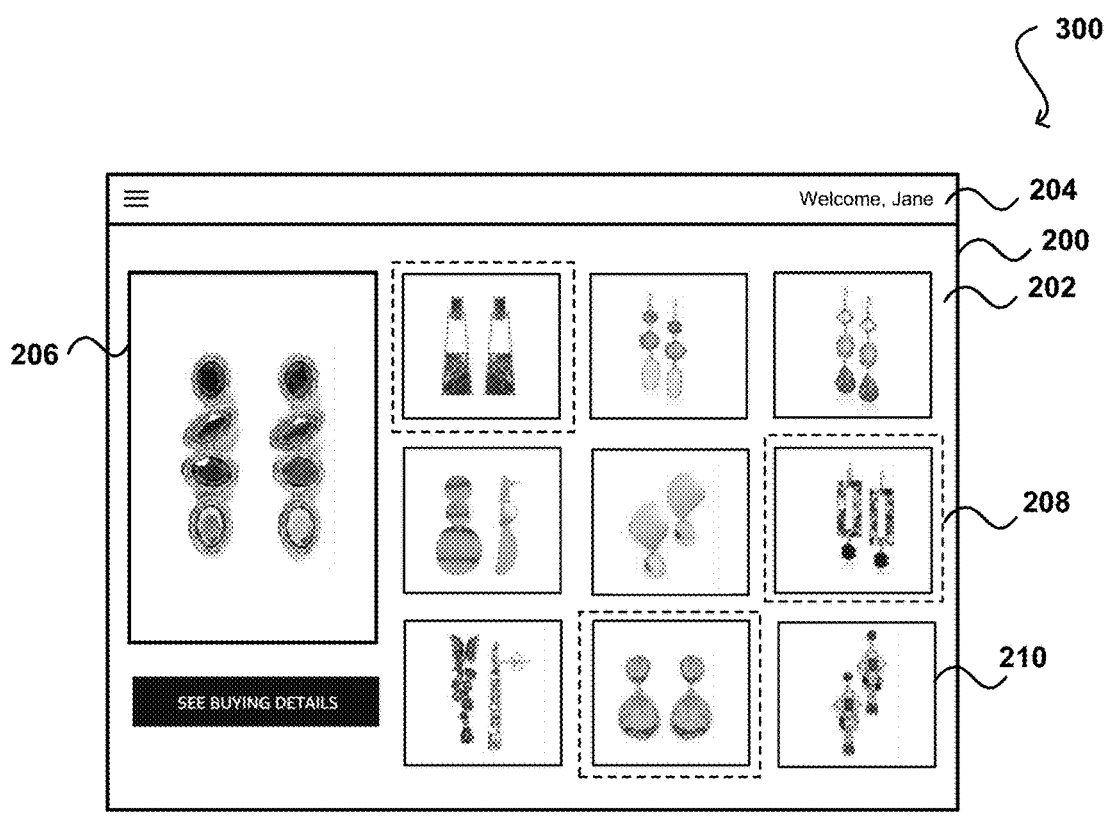
FIG. 3 illustrates another example implementation, in accordance with various embodiments of the present disclosure.

FIG. 3 illustrates another interface 300 configuration for displaying the diverse items 208 and the similar items 210, in accordance with various embodiments. In some embodiments, the diverse item 208 recommendations and the similar item 210 recommendations may be intermixed and displayed together rather than separated into regions or groups. This may provide an organic browsing experience. As mentioned, the recommended products may be displayed in a variety of configurations, depending on user interaction goals, device type, product type, interface design, among many other possible factors.

Figure 4:
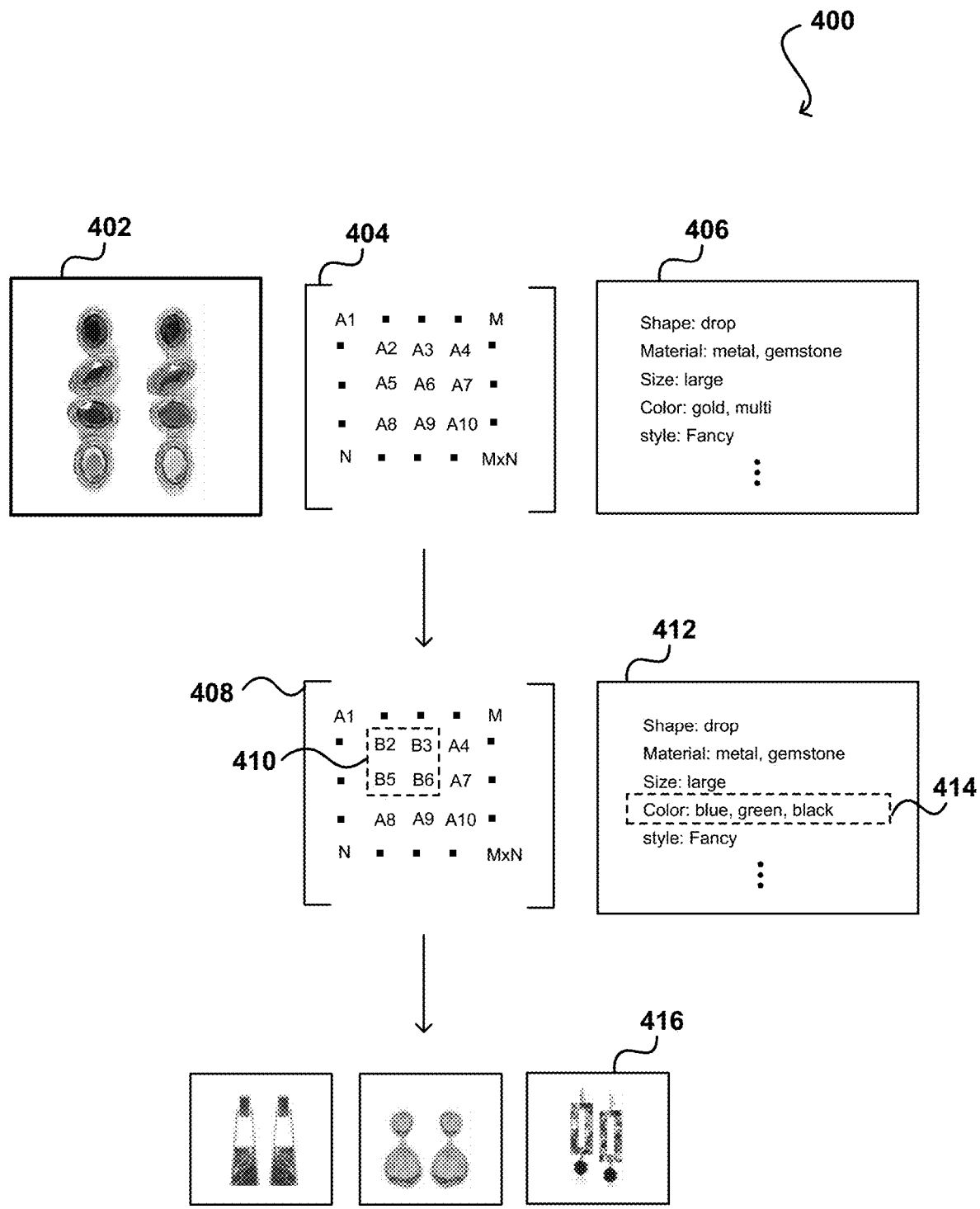
FIG. 4 illustrates a representation of visual search with attribute manipulation, in accordance with various embodiments of the present disclosure.

FIG. 4 illustrates an example representation 400 of visual search with attribute manipulation, in accordance with various embodiments. When a user selects an item of interest 402, the visual search may be initiated to find additional items 416 from a catalog of items to present to the user. In some embodiments, a feature vector 404 describing the item of interest 402 is obtained. This is designated as the original feature vector 404. The feature vector 404 is the computational representation of many attributes of the item of interest 402, including some represented attributes 406 such as shape, material, color, size, item type, and the like. However, the feature vector may express many additional visual attributes that are not easily describable otherwise.

In accordance with various embodiments, there are a number of ways to determine the feature vector 404. In one such approach, embodiments of the present invention can use the penultimate layer of a convolutional neural network (CNN) as the feature vector. For example, classifiers may be trained to identify feature descriptors (also referred herein as visual attributes) corresponding to visual aspects of a respective image of the plurality of images. The feature descriptors can be combined into a feature vector of feature descriptors. Visual aspects of an item represented in an image can include, for example, a shape of the item, color(s) of the item, patterns on the item, as well as different portions of the items as described above, etc. Visual attributes are features that make up the visual aspects of the item. The classifier can be trained using the CNN.

In accordance with various embodiments, CNNs are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer which along with a set of adjacent layers forms the convolution portion of the network. The bottom layer of the convolution layer along with a lower layer and an output layer make up the fully connected portion of the network. From the input layer, a number of output values can be determined from the output layer, which can include several items determined to be related to an input item, among other such options. CNN is trained on a similar data set, so it learns the best feature representation of a desired object represented for this type of image. The trained CNN is used as a feature extractor: input image is passed through the network and intermediate outputs of layers can be used as feature descriptors of the input image. Similarity scores can be calculated based on the distance between the one or more feature descriptors and the one or more candidate content feature descriptors and used for building a relation graph.

An image associated with the item of interest 402 can be analyzed to identify multiple visual attributes of an item and the multiple visual attributes can be used to find the most relevant and most visually similar search results to the query image while allowing for particular attributes of the query image to be manipulated (e.g., changed or removed). The applicable attributes can vary by factors such as the type or category of item and may be determined using a trained neural network to identify the relevant attributes to a particular item or image of an item. In some embodiments, the items in a category can be logically arranged in an n-dimensional multiple attribute space, or representation space, such that the various attributes can be used to refine or locate new search results based on the manipulated visual attributes.

In some embodiments, the feature vectors of the item of interest 402 may already be available in a database because the image data for the item was previously processed to extract the feature vectors of its visual attributes. In this case, the query feature vectors can be obtained directly from the database at the time of the query without any image processing needed. This may be the case when the items in the query are a part of an electronic catalog of items that has been processed according to the training process. In other embodiments, the item may not exist in the database or image data associated with the item has not been processed, and the feature vectors of its visual attributes has not been extracted. In this case, image data representing the item may be obtained and feature extraction may be performed from the image data at the time of the query. For example, the user may see an earring they like at a store or in a magazine and wants to search for similar earrings. The user may take a picture of the earring and provide the image data as a part of the query. In this scenario, the image data is processed on the fly to identify and extract query feature vectors for its visual attributes.

In some embodiments, the original feature vector 404 may be generated on the fly from an image of the selected item, with or without other attributes or item data. In some embodiments, a feature vector may have already been generated for the selected item and stored in a database. In such an embodiment, obtaining the feature vector may refer to getting the feature vector from memory. The original feature vector include a plurality of values, each of which correspond to an attribute. In some embodiments, many attributes in the feature vector contribute to one human-readable attribute, such as color. The original feature vector may be obtained through a neural network, or at least certain layers of a neural network. In some embodiments, the original feature vector may have undergone processing such as dimensionality reduction.

One or more attributes may be manipulated to obtain a target feature vector 408. In some embodiments, one or more manipulate attributes 410 may be determined based on a user input. For example, the user may select an attribute (e.g., color 414) to be changed from the original feature vector. In other embodiments, the attributes to be manipulated may be determined based on server side instructions or preprogrammed protocols rather than based on any input from the user. In some embodiments, the attribute in the original feature vector that were not selected as attributes to manipulate are, by default, attributes to maintain. Regardless of whether the attributes to manipulated were determined based on user input or automatically, new values may be determined for the manipulated attribute, or the value may be left open. If the value is left open, then it could be any value and the results will be agnostic to that particular attribute.

The target feature vector 408 is then generated in which the target feature vector 408 includes a second plurality of values corresponding to the plurality of attributes, including some represented attributes 412 In some embodiments, values in the second plurality of values that correspond to the maintained attributes are the same as the values in the first plurality of values that correspond to the maintained attributes, and the second plurality of values that correspond to the manipulated attributes include the new values which are left open or different from the values in the first plurality of values that correspond to the maintained attributes.

An electronic catalog of items is then queried using the target feature vector, and a set of candidate items 416 are determined from the electronic catalog based at least in part on similarity to the target feature vector. In some embodiments, the target feature vector is compared to the feature vectors for the items in the electronic catalog database using a K-nearest neighbors (KNN) approach, which ranks the feature vectors in the attribute database based on similarity to the target feature vector. In some embodiments, the feature vectors may be ranked based on the "distance" between the target feature vector and each of the feature vectors in the database, in which the shortest distance indicates the highest degree of similarity. In some embodiments, the similarity score is the rank position, the distance, or another measure derived from the rank or distance. A similarity score can be determined using the above-described technique for each item with respect to each of the selected attributes. In some embodiments, the items can be ranked for various attributes based on the respective similarity scores for the individual attributes. After the overall similarity scores are determined for the items, an overall ranking of the items can be determined, which can be used to determine the items returned at search results. In some embodiments, a predetermined number of highest ranking items are presented as search results. In some embodiments, the search results include only items that meet a certain overall similarity score threshold.

In some embodiments, the process may also include determining a set of possible values for a manipulated attribute, determining a group of items for each of the possible values, and selecting an item from each group to include in the candidate items. In some embodiments, additional data such as user data and item data may be used in determining the candidate items. User data may include information such as demographic data of the particular user, the user's browsing or purchase history, among other such data. Item data may include information such as sales data, item price, item availability, item vendor, shipping options, promotional content, among other such data. The arrangement, selection, ranking, and display of items may be determined based on weighing various factoring, including similarity to the target feature vector and any type of additional data, including the example provided above.

Figure 5:
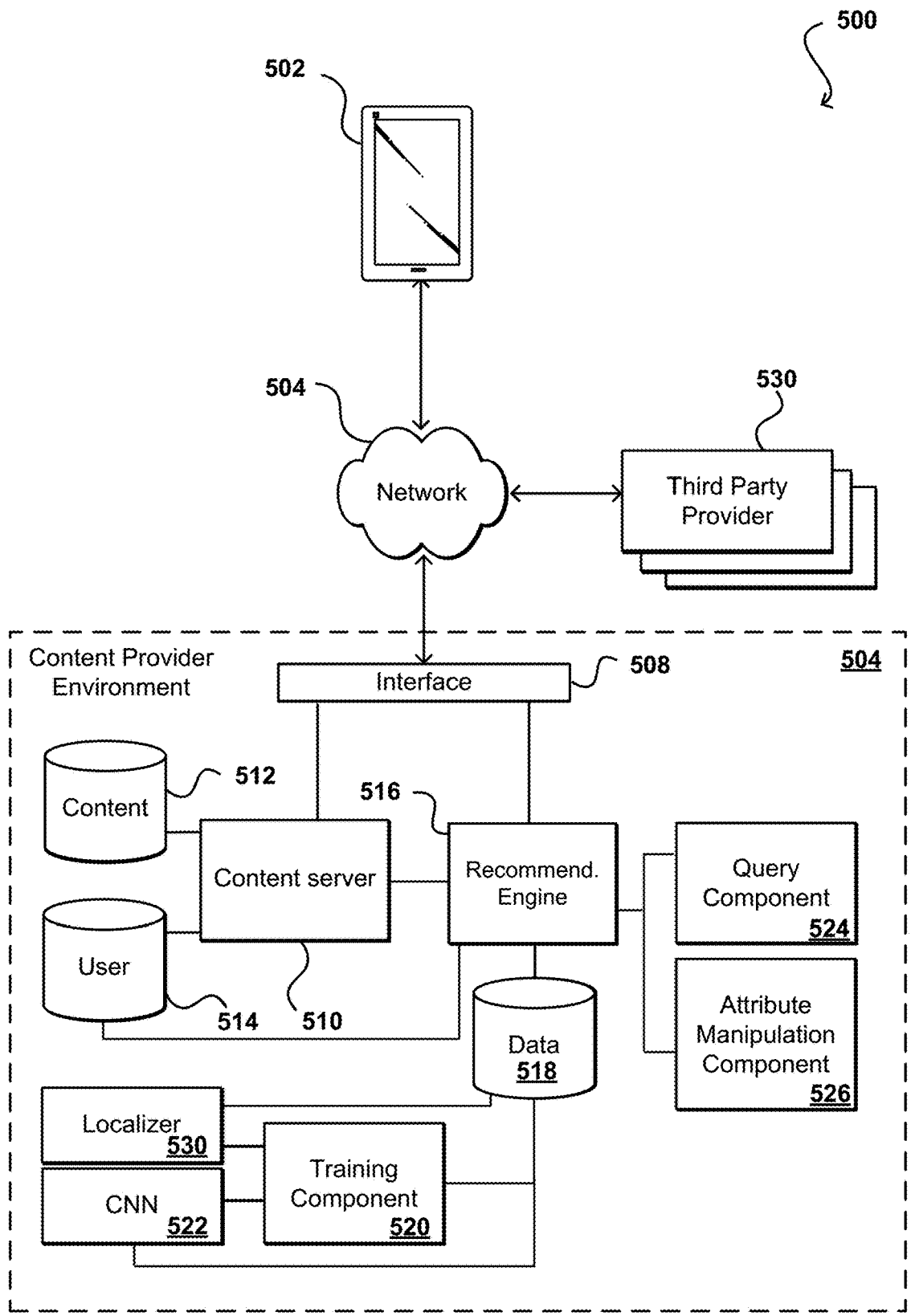
FIG. 5 illustrates an example environment in which aspects of the various embodiments can be implemented, in accordance with various embodiments of the present disclosure.

FIG. 5 illustrates an example environment 500 in which aspects of the various embodiments can be implemented. FIG. 5 illustrates an example environment 500 in which aspects of the various embodiments can be implemented. In this example, a computing device 502 is able to make a call or request across one or more networks 504 to a content provider environment 506. The network(s) can include any appropriate network, such as the Internet, a local area network (LAN), a cellular network, an Ethernet, or other such wired and/or wireless network. The content provider environment 506 can include any appropriate resources for providing content from a resource provider, as may include various servers, data stores, and other such components known or used for providing content from across a network (or from the "cloud"). In this example, a request received to the content provider environment 506 can be received by an interface layer 508 of the environment. As known for network environments, the interface layer can include components such as interfaces (e.g., APIs), load balancers, request and/or data routers, and the like. If the request is a request for content, such as for content for a page to be displayed in an application, information for the request can be directed to one or more content managers 510 and/or content servers, which can obtain the content from a content data store 514 or other such repository to be sent back across the network(s) to the computing device. In some embodiments, information for the request might also be compared against user data in a user data store 512 or other such location do determine, for example, whether the user has access rights to that content. In some embodiments user data might also be analyzed to determine which type of content to provide, additional supplemental content to provide with the primary content, and the like.

In some instances a user might want to refine the results by based on one or more visual attributes associated with one or more items represented in one or more images. In at least some embodiments each category or type of item may have corresponding types of visual attributes that can be used to refine the results. In some embodiments an indication of these attributes can be returned with the initial results, as may be determined by the content server 510 or the recommendation engine based upon data stored in the data repository 518 or determined using a query component 524, visual attribute component 526, among other such options. When a subsequent request including a search query is received including visual attributes of one or more items, the recommendation engine can work with the query component 524 and the visual attribute component 526 to determine, among other things, the feature vector for the visual attributes of the query items and the corresponding search results. As mentioned, in some embodiments the request might specify rankings, magnitudes, or relative weights for the various attributes, which can be set in some embodiments using a weighting component or other such mechanism. The information can be fed back to the recommendation engine 516 which in this example includes the refinement logic to perform the lookup against the data in the data store 518 in order to determine the refined results.

In some embodiments, the initial query and information associated with the query may be received from client device 502 over network 504 and processed by query component 524. In some embodiments, the query may be associated with one or more query images when a selection of an image from a third party provider 532 or content provider environment 506 is selected, such as through the selection of a content item. When a query image is received, for example, a set of query object descriptors may be obtained or determined for the query image. For example, if the query image is not part of an electronic catalog and does not already have associated feature descriptors, the system may generate feature descriptors (both local feature descriptors and object feature descriptors) for the query content in a same and/or similar manner that the feature descriptors are generated for the collection of images, as described. Also, for example, if the query image is part of the collection then the feature descriptors for the query image may be obtained from the appropriate data store. Additionally, the query image can be analyzed to determine local feature descriptors for the query image. Using the clustered feature vectors and corresponding visual words determined for the training images, a histogram for the query image can be determined. The query image can also be analyzed using the neural network 522 to extract a feature vector from the network before the classification layer. This feature vector describes the subject and/or objects shown in the image. Using the local feature descriptors and object feature descriptors, visually similar images in content provider environment 506 can be identified.

The attribute manipulation component 526 may provide for the manipulation of one or more attributes to obtain a target feature vector. Specifically, in some embodiments, One or more attributes to manipulate may be determined based on a user input. For example, the user may select an attribute (e.g., color) to be changed from the original feature vector. In other embodiments, the attributes to be manipulated may be determined based on server side instructions or protocols rather than based on any input from the user. In some embodiments, the attribute in the original feature vector that were not selected as attributes to manipulate are, by default, attributes to maintain. Regardless of whether the attributes to manipulated were determined based on user input or automatically, a new value may be determined for the manipulated attribute, or the value may be left open. If the value is left open, then it could be any value and the results will be agnostic to that particular attribute. A target feature vector is then generated in which the target feature vector includes a second plurality of values corresponding to the plurality of attributes. In some embodiments, values in the second plurality of values that correspond to the maintained attributes are the same as the values in the first plurality of values that correspond to the maintained attributes, and the second plurality of values that correspond to the manipulated attributes include the new values which are left open or different from the values in the first plurality of values that correspond to the maintained attributes. The feature vector can be determined at least in part using neural networks 522 such as a convolutional neural network (CNN) or other feature extraction method. In some embodiments, the appropriate vectors may be determined through training on an appropriate data set. The training component 520 can perform the training on the models and provide the resulting results and/or trained models for use in determining the multiple attribute feature vectors for an image query. In order to determine attributes for various content items, in at least some embodiments, some analysis of content items in an electronic catalog or other data repository is performed to determine information about the visual characteristics of the items. In some embodiments, one or more feature descriptors or vectors can be generated to describe various attributes of an image associated with a set of visual attributes associated with the image. The training component 520 can be the same system or service that is used to train the localizer 530, as well as various face detectors or other models, networks, or algorithms discussed or suggested herein.

In some example embodiments, such as shown in FIG. 5, a neural network 522 such as a convolutional neural network (CNN) can be trained using, for example, images of objects. As mentioned, for CNN-based approaches there can be pairs of images submitted that are classified by a type of attribute, while for GAN-based approaches a series of images may be submitted for training that may include metadata or other information useful in classifying one or more aspects of each image. For example, a CNN may be trained to perform object recognition using images of different types of objects, then learn how the attributes relate to those objects using the provided training data. In certain embodiments, training a neural network may involve significant use of computation resources and time, such that this may correspond to a preparatory step to servicing search requests and/or performed relatively infrequently with respect to search request servicing and/or according to a schedule. An example process for training a neural network for generating descriptors describing visual features of an image in a collection of images begins with building a set of training images. In accordance with various embodiments, each image (or pair of images) in the set of training images can be associated with an object label describing an object depicted in the image or a subject represented in the image. According to some embodiments, training images and respective training object labels can be located in a data store 518 that includes images of a number of different objects.

A training component 520 can utilize the training data set to train the neural network 522. As further described, neural networks can include several learning layers in their architecture. A query image from the training data set is analyzed using the neural network to extract a feature vector from the network before the classification layer. This feature vector describes the subject and/or objects shown in the image. This process can be implemented for each of the images in the data set, and the resulting object feature vectors can be stored in a data store. In various embodiments, the resulting object feature vectors can be compressed for improved processing. For example, the object feature vectors generated by the neural network may include object feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

Figure 6:
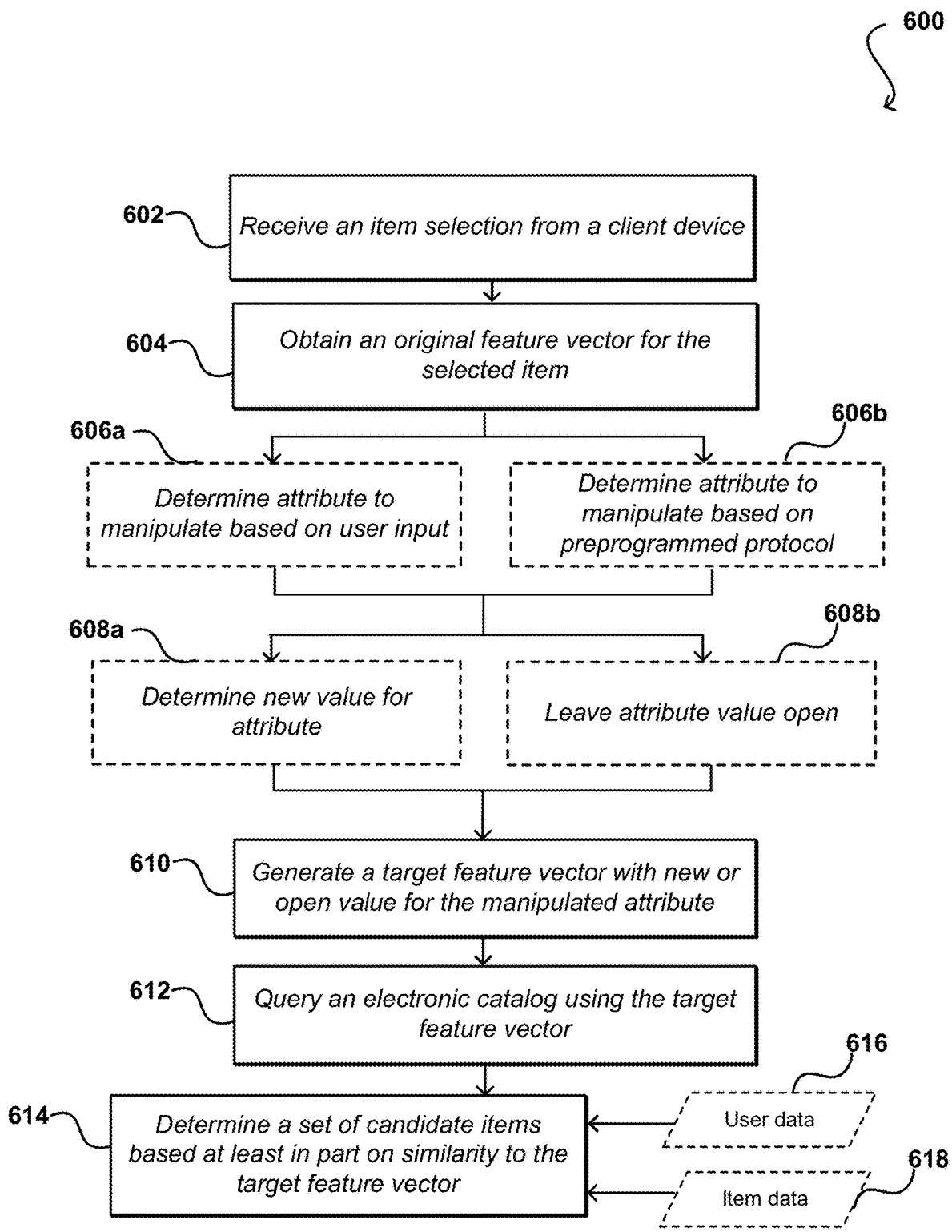
FIG. 6 illustrates an example process for visual search with attribute manipulation, in accordance with various embodiments of the present disclosure.

FIG. 6 illustrates an example process 600 for training a database for parts-based visual similarity search, in accordance with various embodiments. It should be understood that, for any process discussed herein, there can be additional, fewer, or alternative steps performed in similar or alternative orders, or in parallel, within the scope of the various embodiments. In this example, the process may be initiated when an item selection is received 602 from a client device. This may be a user selecting an item from the interface of an e-commerce website or other electronic catalog of items. In some embodiments, the user may upload an image of an item of interest or provide a link to an item of interest outside of the e-commerce website. All of these may be examples of an item selection. Subsequently, an original feature vector for the selected item may be obtained 604. In some embodiments, the original feature vector may be generated on the fly from an image of the selected item, with or without other attributes or item data. In some embodiments, a feature vector may have already been generated for the selected item and stored in a database. In such an embodiment, obtaining the feature vector may refer to getting the feature vector from memory. The original feature vector include a plurality of values, each of which correspond to an attribute. In some embodiments, many attributes in the feature vector contribute to one human-readable attribute, such as color. The original feature vector may be obtained through a neural network, or at least certain layers of a neural network. In some embodiments, the original feature vector may have undergone processing such as dimensionality reduction.

In example process 600, one or more attributes may be manipulated to obtain a target feature vector. Specifically, in some embodiments, One or more attributes to manipulate may be determined 606a based on a user input. For example, the user may select an attribute (e.g., color) to be changed from the original feature vector. In other embodiments, the attributes to be manipulated may be determined 606b based on server side instructions or preprogrammed protocols rather than based on any input from the user. In some embodiments, the attribute in the original feature vector that were not selected as attributes to manipulate are, by default, attributes to maintain. Regardless of whether the attributes to manipulated were determined based on user input or automatically, a new value may be determined 608a for the manipulated attribute, or the value may be left open 608b. If the value is left open, then it could be any value and the results will be agnostic to that particular attribute.

A target feature vector is then generated 610 in which the target feature vector includes a second plurality of values corresponding to the plurality of attributes. In some embodiments, values in the second plurality of values that correspond to the maintained attributes are the same as the values in the first plurality of values that correspond to the maintained attributes, and the second plurality of values that correspond to the manipulated attributes include the new values which are left open or different from the values in the first plurality of values that correspond to the maintained attributes. An electronic catalog of items is then queried 612 using the manipulated feature vector, and a set of candidate items are determined 614 from the electronic catalog based at least in part on similarity to the target feature vector. In some embodiments, the process may also include determining a set of possible values for a manipulated attribute, determining a group of items for each of the possible values, and selecting an item from each group to include in the candidate items. In some embodiments, additional data such as user data 616 and item data 618 may be used in determining the candidate items. User data 616 may include information such as demographic data of the particular user, the user's browsing or purchase history, among other such data. Item data 618 may include information such as sales data, item price, item availability, item vendor, shipping options, promotional content, among other such data. The arrangement, selection, ranking, and display of items may be determined based on weighing various factoring, including similarity to the target feature vector and any type of additional data, including the example provided above.

Figure 7:
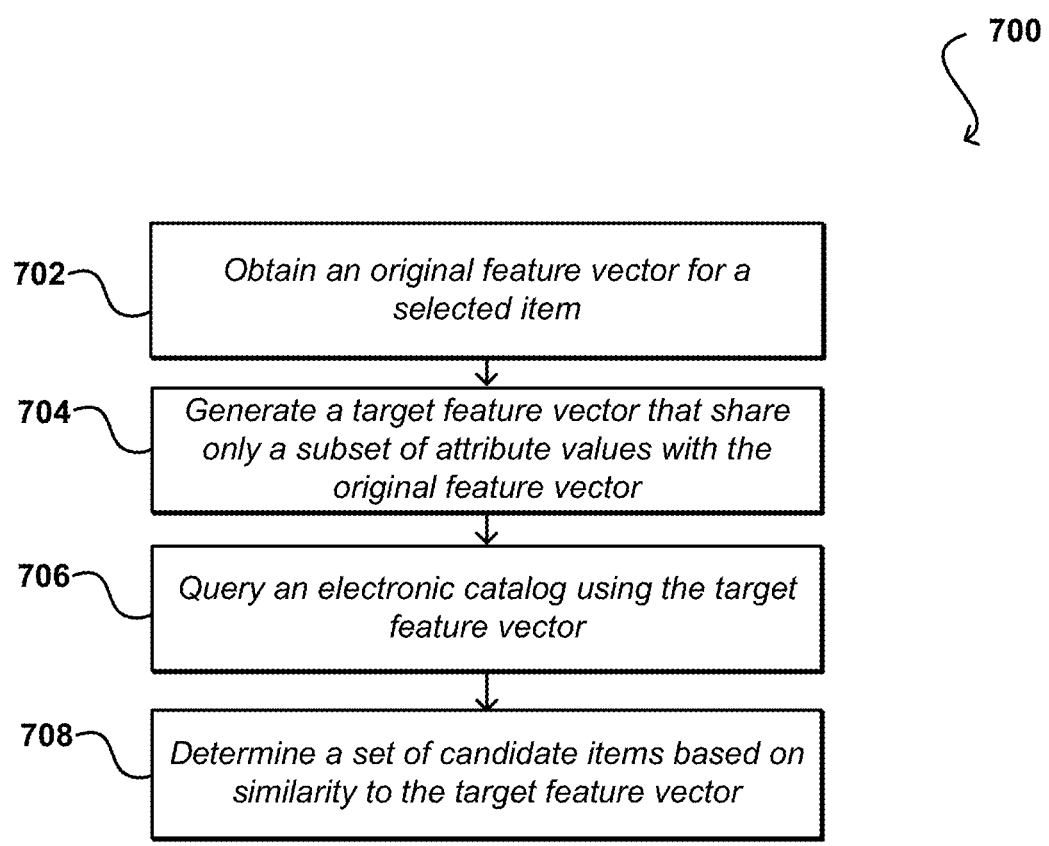
FIG. 7 illustrates another example process visual search with attribute manipulation, in accordance with various embodiments of the present disclosure.

FIG. 7 illustrates an example process 700 for training a database for parts-based visual similarity search, in accordance with various embodiments. In this example, an original feature vector is obtained 702 for a selected item. As mentioned, This may include a user selecting an item (e.g., product) from the interface of an e-commerce website or other electronic catalog of items. In some embodiments, the user may upload an image of an item of interest or provide a link to an item of interest outside of the e-commerce website. All of these may be examples of an item selection. In such an embodiment, obtaining the feature vector may refer to getting the feature vector from memory. The original feature vector include a plurality of values, each of which correspond to an attribute. In some embodiments, many attributes in the feature vector contribute to one human-readable attribute, such as color. The original feature vector may be obtained through a neural network, or at least certain layers of a neural network. In some embodiments, the original feature vector may have undergone processing such as dimensionality reduction.

A target feature vector is then generated 704 at least partially from the original feature vector, in which the target feature vector shares only a subset of attribute values with the original feature vector and includes at least some values that are different from the original feature vector. An electronic catalog of items is then queried 706 using the target feature vector, and a set of candidate items are determined 708 from the electronic catalog based at least in part on similarity to the target feature vector.

Figure 8:
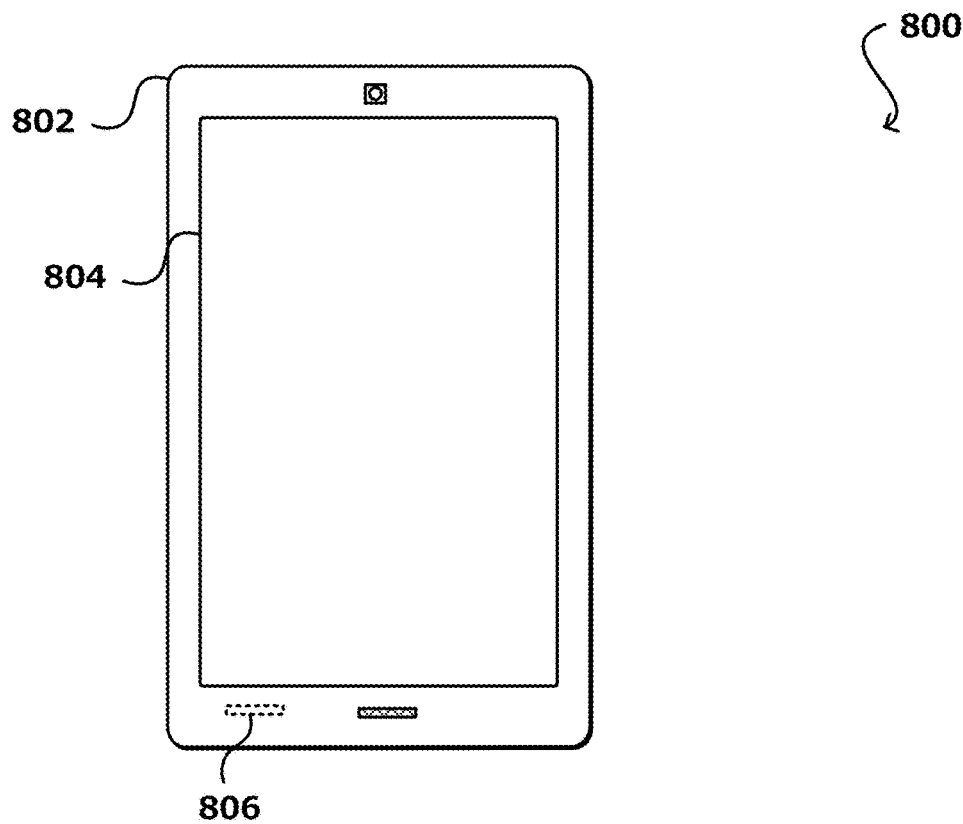
FIG. 8 illustrates an example computing device that can be used, in accordance with various embodiments of the present disclosure.

FIG. 8 illustrates an example computing device 800 that can be used in accordance with various embodiments. Although a portable computing device (e.g., a smart phone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, wearable computers (e.g., smart watches or glasses), television set top boxes, and portable media players, among others. In this example, the computing device 800 has a display screen 804 and an outer casing 802. The display screen under normal operation will display information to a user (or viewer) facing the display screen (e.g., on the same side of the computing device as the display screen). As discussed herein, the device can include one or more communication components 806, such as may include a cellular communications subsystem, Wi-Fi communications subsystem, BLUETOOTH® communication subsystem, and the like.

Figure 9:
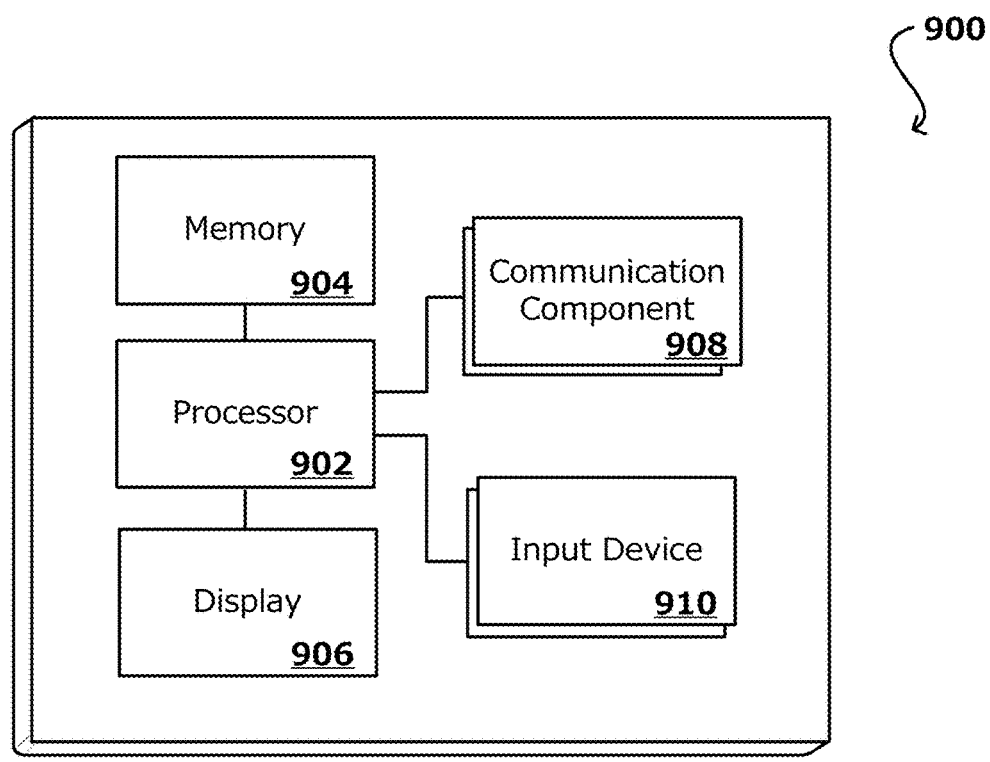
FIG. 9 illustrates a set of basic components of one or more devices of the present disclosure, in accordance with various embodiments of the present disclosure.

FIG. 9 illustrates a set of basic components of one or more devices 900 of the present disclosure. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. The device can include at least one communication component 908, as may enabled wired and/or wireless communication of voice and/or data signals, for example, over a network such as the Internet, a cellular network, a Wi-Fi network, BLUETOOTH®, and the like. The device can include at least one additional input device 910 able to receive conventional input from a user. This conventional input can include, for example, a push button, touch pad, touch screen, wheel, joystick, keyboard, mouse, trackball, camera, microphone, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device. As discussed, different approaches can be implemented in various environments in accordance with the described embodiments.

Figure 10:
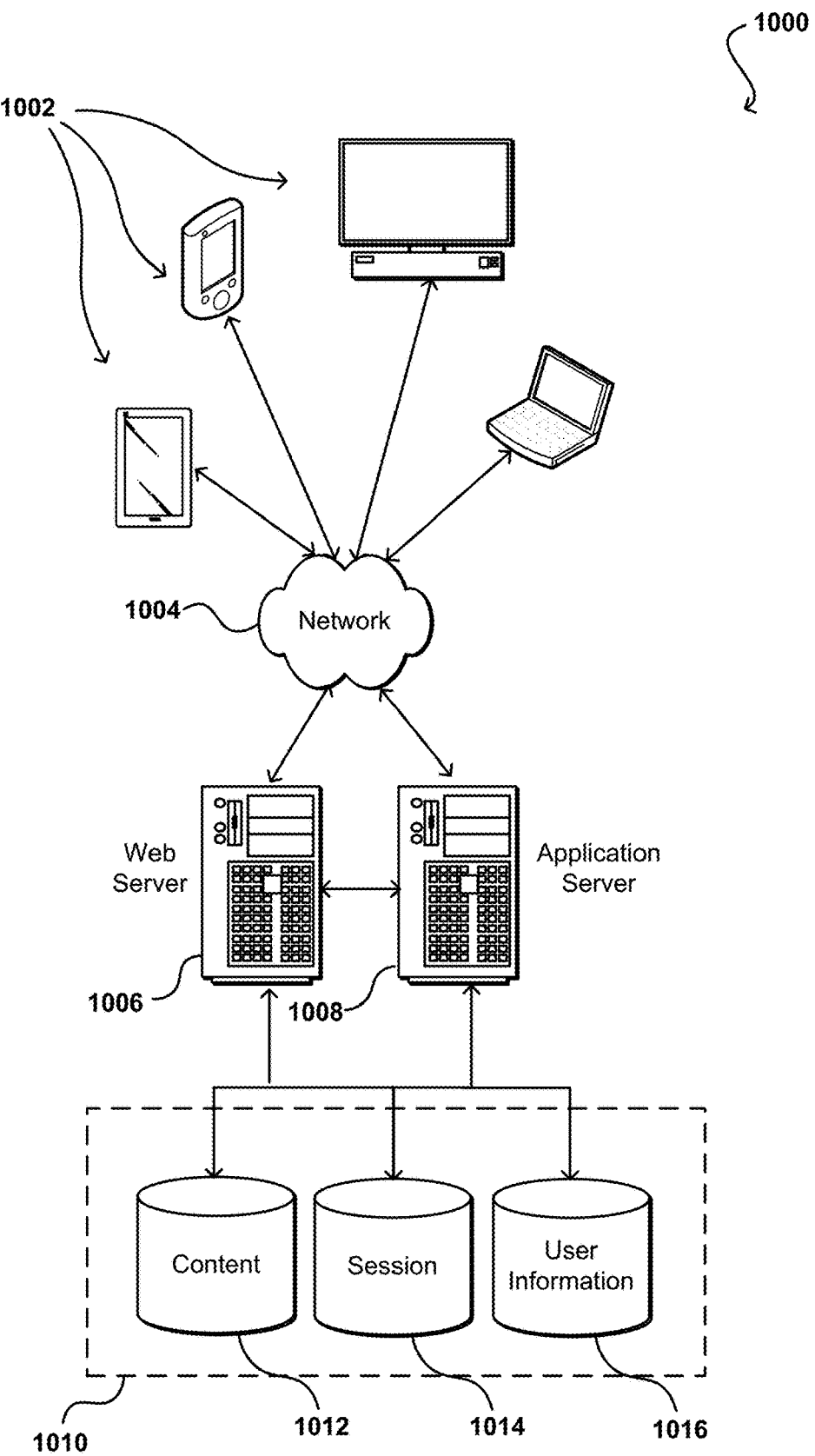
FIG. 10 illustrates an example environment for implementing aspects, in accordance with various embodiments of the present disclosure.

FIG. 10 illustrates an example environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure. The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one computing device processor; and
   a memory device including instructions that, when executed by the at least one computing device processor, cause the system to:
   receive a selection of an item in an electronic catalog from a client device;
   obtain an original feature vector representation of the item, the original feature vector having a first plurality of values corresponding to a plurality of attributes;
   determine at least one attribute of the plurality of attributes to maintain;
   determine at least one attribute of the plurality of attributes to modify based on a preprogrammed protocol;
   modify one or more respective values associated with the at least one attribute based at least in part on the preprogrammed protocol;
   generate a target feature vector comprising a second plurality of values corresponding to the plurality of attributes,
      wherein values in the second plurality of values that correspond to the maintained attributes are the same as the values in the first plurality of values that correspond to the maintained attributes; and
      wherein values in the second plurality of values that correspond to the modified attributes are different from the values in the first plurality of values that correspond to the modified attributes;
   query the electronic catalog using the target feature vector, wherein the electronic catalog includes a plurality of images associated with a plurality of items, respectively;
   compare the target feature vector to feature vector representations of the plurality of images;
   determine a first set of candidate items from the electronic catalog based at least in part on similarity between the feature vector representation of images associated with the first set of candidate items and the target feature vector; and
   display the first set of candidate items on the client device.

2. The system of claim 1, wherein the instructions when executed further cause the system to:
   determine the first set of candidate items based at least in part on respective data associated with the candidate items, user data associated with the client device, or both,
   wherein data associated with the candidate items include at least one of sales data, item price, item availability, item vendor, shipping options, or promotional content; and wherein user data comprises at least one of user demographic information, browsing data, and purchasing data.

3. The system of claim 1, wherein the instructions when executed further cause the system to:
  determine a set of possible values for a modified attribute;
  determine a group of items for each of the possible values; and
  select an item from each group to include in the first set of candidate items.

4. The system of claim 1, wherein the instructions when executed further cause the system to:
  query the electronic catalog using the original feature vector;
  determine a second set of candidate items from the electronic catalog based on similarity to the original feature vector; and
  display the second set of candidate items with the first set of candidate items on the client device.

5. A computer-implemented method, comprising:
  obtaining an original feature vector representation of an item, the original feature vector having a first plurality of values corresponding to a plurality of attributes;
  selecting an attribute of the plurality of attributes to modify based on a preprogrammed protocol;
  modifying a value associated with the attribute based at least in part on the preprogrammed protocol;
  generating a target feature vector having a second plurality of values corresponding to at least some of the plurality of attributes,
    wherein the target feature vector has the same values as the original feature vector for at least a first attribute of the plurality of attributes; and
    wherein the target feature vector has different values from the original feature vector or no values for at least a second attribute of the plurality of attributes;
  querying a database of items using the target feature vector, wherein the database includes a plurality of images associated with a plurality of items, respectively;
  comparing the target feature vector to feature vector representations of the plurality of images; and
  determining one or more candidate items from the database based at least in part on similarity between the feature vector representation of images associated with the one or more candidate items and the target feature vector.

6. The method of claim 5, further comprising:
  receiving an attribute manipulation input from a client device;
  determining a third attribute based on the attribute manipulation input.

7. The method of claim 6, further comprising:
  determining a value corresponding to the third attribute for the target feature vector based on the attribute manipulation input.

8. The method of claim 5, further comprising:
  determining the second attribute based on the preprogrammed protocol.

9. The method of claim 8, wherein the preprogrammed protocol selects a random attribute as the second attribute.

10. The method of claim 5, further comprising:
  determining a value corresponding to the second attribute for the target feature vector based on the preprogrammed protocol.

11. The method of claim 10, wherein the preprogrammed protocol determines the value corresponding to the second attribute based at least in part on one or more of sales data, item price, item availability, item vendor, shipping options, promotional content, user demographic information, browsing data, or purchasing data.

12. The method of claim 5, further comprising:
  generating the target feature vector without a value for the second attribute.

13. The method of claim 5, wherein the original feature vector is derived from an image of the item, text-based data, or both.

14. The method of claim 5, further comprising:
  receiving image data via a link provided from the client device or uploaded from the client device; and
  determining the original feature vector based at least in part on the image data.

15. The method of claim 5, further comprising:
  querying the database using the original feature vector;
  determining a second set of candidate items from the electronic catalog based on similarity to the original feature vector; and
  displaying the second set of candidate items with the one or more candidate items on the client device.

16. A system, comprising:
  at least one computing device processor; and
  a memory device including instructions that, when executed by the at least one computing device processor, cause the system to:
    obtain an original feature vector representation of an item, the original feature vector having a first plurality of values corresponding to a plurality of attributes;
    select an attribute of the plurality of attributes to modify based on a preprogrammed protocol;
    modify a value associated with the attribute based at least in part on the preprogrammed protocol;
    generate a target feature vector having a second plurality of values corresponding to at least some of the plurality of attributes,
      wherein the target feature vector has the same values as the original feature vector for at least a first attribute of the plurality of attributes; and
      wherein the target feature vector has different values from the original feature vector or no values for at least a second attribute of the plurality of attributes;
    query a database of items using the target feature vector, wherein the database includes a plurality of images associated with a plurality of items, respectively;
    compare the target feature vector to feature vector representations of the plurality of images; and
    determine one or more candidate items from the database based at least in part on similarity between the feature vector representation of images associated with the one or more candidate items and the target feature vector.

17. The system of claim 16, wherein the instructions when executed further cause the system to:
  receive an attribute manipulation input from a client device;
  determine a third attribute based on the attribute manipulation input.

18. The system of claim 16, wherein the instructions when executed further cause the system to:
  determine a value corresponding to the third attribute for the target feature vector based on the attribute manipulation input.

19. The system of claim 16, wherein the instructions when executed further cause the system to:
   determine the second attribute based on the preprogrammed protocol.

20. The system of claim 16, wherein the instructions when executed further cause the system to:
   query the database using the original feature vector;
   determine a second set of candidate items from the electronic catalog based on similarity to the original feature vector; and
   display the second set of candidate items with the one or more candidate items on the client device.

* * * * *